(12) United States Patent
Jauss

(10) Patent No.: US 12,549,676 B2
(45) Date of Patent: Feb. 10, 2026

(54) ENDOSCOPY PROCEDURE FOR IMPROVED DISPLAY OF A VIDEO SIGNAL AND ASSOCIATED ENDOSCOPY SYSTEM AND COMPUTER PROGRAM PRODUCT

(71) Applicant: SCHÖLLY FIBEROPTIC GMBH, Denzlingen (DE)

(72) Inventor: Joachim Jauss, Rheinhausen (DE)

(73) Assignee: SCHÖLLY FIBEROPTIC GMBH, Denzlingen (DE)

( * ) Notice: Subject to any disclaimer, the term of this patent is extended or adjusted under 35 U.S.C. 154(b) by 0 days.

(21) Appl. No.: 17/074,836

(22) Filed: Oct. 20, 2020

(65) Prior Publication Data

US 2021/0120149 A1 Apr. 22, 2021

(30) Foreign Application Priority Data

Oct. 22, 2019 (DE) .......................... 102019128554.2

(51) Int. Cl.
*H04N 5/20* (2006.01)
*A61B 1/00* (2006.01)
*G06T 7/00* (2017.01)
*H04N 19/70* (2014.01)
*H04N 23/00* (2023.01)
(Continued)

(52) U.S. Cl.
CPC .......... *H04N 5/20* (2013.01); *A61B 1/000096* (2022.02); *G06T 7/0012* (2013.01); *H04N 19/70* (2014.11); *H04N 23/00* (2023.01); *H04N 23/86* (2023.01); *G06T 2207/10016* (2013.01); *G06T 2207/10068* (2013.01); *H04N 23/555* (2023.01)

(58) Field of Classification Search
CPC .......... H04N 5/225; H04N 19/70; H04N 9/68; G06T 7/0012
See application file for complete search history.

(56) References Cited

U.S. PATENT DOCUMENTS

2005/0195205 A1* 9/2005 Abrams ............... G09G 3/3611
345/545
2007/0060798 A1* 3/2007 Krupnik ................. A61B 5/065
600/300
(Continued)

FOREIGN PATENT DOCUMENTS

WO 2015163942 A1 10/2015
WO 2018152196 A1 8/2018
WO 2019122338 A1 6/2019

OTHER PUBLICATIONS

HDMI Video Endoscope System, Accessed Sep. 29, 2020. https://web.archive.org/web/20180525091615/www.fiberscope.net/imagepro-hdmi.
(Continued)

*Primary Examiner* — Kathleen V Nguyen
(74) *Attorney, Agent, or Firm* — Grogan, Tuccillo & Vanderleeden, LLP

(57) ABSTRACT

To summarize, it is proposed for improving the display of a variable video data stream recorded with a video endoscopy system on a monitor that the video endoscopy system automatically transmits at least one parameter and transmits it to the monitor, wherein the display of a currently transmitted section of the video data stream, preferably in real time, can be adjusted using the parameter to enable an adjusted display of that section on the monitor.

22 Claims, 2 Drawing Sheets

(51) Int. Cl.
  *H04N 23/86*   (2023.01)
  *H04N 23/50*   (2023.01)

(56) References Cited

U.S. PATENT DOCUMENTS

| | | | | |
|---|---|---|---|---|
| 2012/0262559 | A1* | 10/2012 | On | A61B 1/00009 |
| | | | | 348/208.4 |
| 2013/0335388 | A1* | 12/2013 | Yun | G09G 3/2003 |
| | | | | 345/207 |
| 2014/0320684 | A1* | 10/2014 | Chatenever | A61B 1/00006 |
| | | | | 348/211.4 |
| 2015/0110202 | A1* | 4/2015 | Tucker | H04N 21/234309 |
| | | | | 375/240.26 |
| 2015/0245043 | A1* | 8/2015 | Greenebaum | H04N 19/137 |
| | | | | 375/240.25 |
| 2017/0095297 | A1* | 4/2017 | Richmond | A61B 34/30 |
| 2017/0311777 | A1* | 11/2017 | Hirayama | A61B 1/0661 |
| 2018/0018932 | A1* | 1/2018 | Atkins | G09G 5/005 |
| 2018/0130429 | A1* | 5/2018 | Son | G06T 15/50 |
| 2018/0233075 | A1* | 8/2018 | Boyd | H04N 19/44 |
| 2018/0338152 | A1 | 11/2018 | Yamauchi | |
| 2019/0090954 | A1* | 3/2019 | Kotian | G16H 70/20 |
| 2019/0357758 | A1* | 11/2019 | Malinskiy | A61B 1/0669 |

OTHER PUBLICATIONS

HDMI Forum Inc. Release 2.0A Specification, Enables Transmission of High Dynamic Range (HDR) Formats, Apr. 8, 2015. https://web.archive.org/web/20170108094840/hdmiforum.hdmi-forum-inc.

* cited by examiner

ENDOSCOPY PROCEDURE FOR IMPROVED DISPLAY OF A VIDEO SIGNAL AND ASSOCIATED ENDOSCOPY SYSTEM AND COMPUTER PROGRAM PRODUCT

CROSS-REFERENCE TO RELATED APPLICATIONS

This application claims the priority benefit of German Patent Application No. 102019128554.2 filed on Oct. 22, 2019, hereby incorporated by reference for all that is disclosed as though fully set forth herein.

FIELD OF THE INVENTION

The invention relates to an endoscopy procedure in which an image sequence is recorded using an image sensor of an endoscopy system, wherein an image processing unit generates a video data stream from the image sequence, which data stream is transmitted to a monitor to be displayed by the monitor.

The invention further relates to an associated endoscopy system. This system includes an endoscope having an image sensor for outputting a sensor signal encoding an image sequence and an image processing unit for generating a video data stream by processing the sensor signal and for outputting a video signal encoding the video data stream, which signal is displayable on a monitor.

Lastly, the invention relates to a computer program product, which can be loaded into an internal memory of an endoscopy system and which comprises a software code.

BACKGROUND OF THE INVENTION

Procedures as described at the outset are known and are used, for example, in endoscopic examinations in the medical and non-medical fields. It was found in this context that there are highly differing examination and image recording conditions which influence specific characteristics of the video data stream recorded with the endoscopy system, wherein these characteristics are of relevance for displaying the video data stream on a monitor. A frequently occurring problem is that the monitor is not optimally set up for displaying a video signal currently transmitted to the monitor. Accordingly, the display must be laboriously manually modified until a satisfactory display of the video data stream is achieved.

In the meantime, image reproduction methods are known in the prior art with which a dynamic scope of video images can be optimally utilized. The basic idea is to use an available maximum resolution in bits, for example 10 bits, on that range of a display parameter such as image brightness, color space, or contrast, which actually occurs in the video image.

Simply put, it makes little sense to make resolution available for dark brightness levels if an image substantially has only bright brightness levels. Instead, it makes sense in such a situation to use the existing resolution for displaying the bright brightness levels to be able to display even finest nuances accurately and obtain an optimized video display in this manner.

Starting from here, it is the problem of the invention to improve the display of a video data stream recorded using an endoscopy system, wherein the user of the system is to be relieved. The improvement is specifically to be made accessible for video endoscopy.

To solve this problem according to the invention, the feature of claim 1 are provided for an endoscopy procedure. Particularly, it is proposed according to the invention for solving the problem in an endoscopy procedure of the type mentioned at the outset that the image processing unit generates at least one parameter when generating the video signal, which parameter is used for adjustment of a display of the video signal on the monitor and that the at least one parameter is transmitted to the monitor to automatically adjust the display of the video signal.

It goes without saying that this procedure may also comprise the step that the display of the video data stream on the monitor is indeed adjusted. This adjustment is preferably performed automatically by the monitor itself. In other words, the monitor can be configured to adjust the display of the video data stream based on the at least one parameter transmitted.

This procedure can be implemented particularly easily in that a video recording is started by a user and the endoscopy system then generates a parameter, particular in response to a respective user input, and transmits it to the monitor to adjust the display of the video data stream. This adjustment can be retained or—in response to another user input or automatically at regular intervals—be adjusted by the endoscopy system, specifically by another transmission of at least one current parameter.

In other words, it is proposed that the image processing unit has a controlling influence on the monitor when the endoscopy system is in operation by transmitting at least one parameter for improving the video signal display on the monitor, for example, to adjust it to current needs. This improvement/adjustment can preferably be performed automatically when the endoscopy system is in operation, such that the user does not have to make any adjustments at the monitor.

The method according to the invention makes it therefore possible to automatically adjust the display of the video signal depending on the currently transmitted video signal, such that the display of the video signal on the monitor is always optimized without the need for a user to make laborious changes of display parameters or the like at the monitor.

SUMMARY OF THE INVENTION

As will still have to be explained in more detail, particularly control data can be transmitted to the monitor, such that the monitor automatically adjusts the display of the video signal to current needs, for example with respect to a current dynamic brightness range of the video data stream.

Another advantage of this method is that an automatic adjustment of the display of the video signal on the monitor can be performed dynamically during a running video recording using the endoscopy system, such that changing recording conditions automatically result in a respectively adjusted display of the video signal on the monitor.

Said video data stream as well as said image sequence can therefore consist of a sequence of frames. However, the frames of the video data stream can considerably deviate from the frames of the image sequence, for example if noise suppression or other signal processing has been applied to the image sequence, specifically the sensor signals from the image sensor, when generating the video data stream from the image sequence.

According to the invention, the problem can also be solved by other advantageous embodiments according to the dependent claims.

For example, the at least one parameter can be generated based on an analysis of a sensor signal which encodes the image sequence output from the image sensor and/or the video data stream, that is, particularly, the video signal.

Preferably, the at least one parameter can be adjusted dynamically, particularly by said image processing unit of the endoscopy system, if a variable changes that is relevant to the display of the video data stream on the monitor. Such a variable can for example be a dynamic range of an image brightness or of a color or contrast space to be displayed on the monitor or the like.

The at least one parameter can for example comprise metadata which characterize the video data stream to be displayed. This metadata can be obtained based on the analysis described above, that is, particularly by image processing of the video data stream, which can preferably be done by means of the image processing unit.

Metadata can be considered structured data which contains information about features of other data. For example, an average or maximum value or a dynamic range can each be metadata of an associated dataset of measured values.

With reference to the endoscopy procedure discussed herein, metadata can be understood as such data that contains information about properties of the video data stream, such as brightness, contrast, color, image structures, etc. This information can describe, for example, the respective dynamic range, stochastic distribution, e.g. in the form of histograms, or extreme values or statistical variables of such properties of the video data stream.

A histogram is the graphic representation of the tonal value distribution of an image; it is therefore frequently called tonal response curve and reflects the frequency distribution of tonal values of an image. The histogram therefore indicates how frequently different tonal values are present in the image. A tonal value can in this context be a color or gray scale value within a specified color or gray scale spectrum.

Furthermore, a distinction can be made between metadata and dynamic metadata. While static metadata can be determined once for an already existing video data stream, dynamic metadata is based on respective chronological sections, e.g. individual scenes, of the video data stream and can thus change from section to section.

According to a potential embodiment, the invention exactly proposes to generate dynamic metadata based on a live video data stream of the endoscope and to use this data to dynamically adjust the display of the video data stream or the associated video signal on the monitor. This makes it possible to adjust and thus to improve the display of the video signal on the monitor for each current scene, that is, for example, to the current lighting conditions or the current color and/or brightness and/or contrast range of the video data stream.

Alternatively or in addition, the at least one parameter can also comprise control data for setting display parameters of the monitor. This control data can be obtained from metadata as explained above, particularly by the image processing unit.

Such control data can for example be used for setting display parameters, such as a background lighting and/or a dynamic range of a brightness and/or a color space and/or an image contrast to be resolved.

Likewise, control data and/or display parameters can be or are generated from the metadata, particularly by the image processing unit. Alternatively, metadata can be transmitted to the monitor, such that the monitor generates control data and/or display parameters from the metadata. In any case, the display of the video data stream on the monitor can then be adjusted using such control data and/or display parameters.

If below the at least one parameter is mentioned, the statements always apply likewise to metadata and/or control data which are transmitted to the monitor as part of the procedure.

The at least one parameter can preferably be generated even before the video signal is transmitted to the monitor, but only after generating the video signal. This particularly allows transmitting the at least one parameter synchronously with the associated chronological section of the video signal to the monitor, preferably in such a manner that the display of the chronological section on the monitor can be adjusted live without a time delay. In this manner, a live-adjusted display of the video signal is achieved.

The display of the video signal and the video data stream encoded therein can be adjusted based on the at least one parameter transmitted, particularly by the monitor itself. Such an adjustment of the display can preferably be made globally for respective frames of the video data stream. The adjustment can also be similar for multiple of these frames. This can be the case, for example, if specific characteristics of the video signal, for example, a dynamic range, do not noticeably change or if the adjustment is not made for each frame, but at specific time intervals for a specific number of consecutive frames.

In order to achieve optimum adjustment, a dynamic range and/or a resolution capacity of the monitor, for example with respect to a potential display of brightness and/or color and/or contrast values, can be considered when generating the at least one parameter. This information can either be stored in advance in the endoscopy system, for example, if the system is adapted to a specific monitor, or it can be exchanged between the monitor and the endoscopy system, for example, if different monitors are to be usable with the endoscopy system.

The image sequence obtained with the image sensor of the endoscopy system can not just consist of individual recordings, but particularly of real-time images. In the latter case, a live video signal can be transmitted to the monitor, and it is preferred in this case that the at least one parameter is generated in real time and/or is transmitted to the monitor synchronously with the live video signal. This is because in this case, an adjustment can be made live without a time delay.

The term 'real time' characterizes the operation of information technology systems which deliver specific results reliably within a specified period of time, for example in a fixed time frame or at fixed time intervals. For the case of video endoscopy discussed herein, real time can therefore be interpreted such that the respective results of an evaluation are available at least at the clock rate of the video signal, which corresponds to the frame rate, such that the evaluation is concluded within a recording time for a frame of the video data stream.

The at least one parameter can therefore be generated continuously together with the live video signal, while the image sequence is recorded using the image sensor of the endoscopy system.

Furthermore, the at least one parameter can be added to the video signal in real time during image recording to adjust the display of the video signal dynamically in real time.

In specific recording situations, it may be necessary that the at least one parameter to be transmitted to the monitor is generated dynamically from the video data stream. This can particularly take place in that the at least one parameter changes automatically as soon as at least one evaluation parameter, preferably one obtained from the video data stream, changes significantly. The at least one evaluation parameter can for example be obtained from brightness and/or color and/or contrast values of the image sequence and/or the video data stream. Furthermore, the at least one evaluation parameter can be compared to a threshold value. This allows to decide if a significant change is has occurred or not.

The advantage, particularly in medical applications, is that due to the dynamic adjustment of the at least one parameter, that is, particularly the metadata and/or control data mentioned above, it becomes possible during ongoing operation of the endoscopy system that the at least one parameter and thus the display of the video data stream can be adjusted live to a respective surgical (OR) situation, that is, a respective scene to be recorded. This adjustment can be made automatically by the endoscopy system without any user input, which relieves the surgeon from additional changes of settings on the monitor and always allows an optimized display of the live video.

Specifically for medical applications, the invention proposes to store the at least one parameter in the form of a collection of parameter sets in an internal memory of the endoscopy system. Such parameter sets can be optimized for various image scenarios, particularly for different image recording conditions during a specific class of surgical interventions to allow a video display that is optimized for the surgeon's needs.

Preferably, a selection device, which preferably is part of the image processing unit, can select a respective parameter set from the stored parameter sets, preferably in real time, for transmission to the monitor.

This selection of the current parameter set can be made based on a sensor signal of the image sensor that encodes the image sequence and/or based on an image evaluation of the video data stream obtained from such sensor signal. The selection can be based on a dynamic range and/or a determined distribution—e.g., of an image brightness and/or an image contrast and/or image colors or the like—obtained from the sensor signal or the video data stream, respectively.

Alternatively or in addition, the selection of the current parameter set can also be made by a user of the endoscope. This can be done based on a selection of preset parameter sets offered by the endoscopy system, which parameter sets can be optimized for typical recording conditions of a class of surgical interventions. Static metadata and/or static control data can be transmitted to the monitor, particularly in a static transmission mode between two selections made by the user. In this variant of the procedure according to the invention, the endoscopy system continues to generate at least one parameter which is used to adjust a display of the video signal on the monitor. However, in this case a transmission takes place just once in a static transmission mode. Only upon a new selection or input by the user, the endoscopy system generates a new at least one parameter and transmits it to the monitor.

According to another embodiment of the procedure, an image evaluation of the video data stream running to generate the at least one parameter can be based on an algorithm which can be trained using sample image data, wherein this image evaluation can particularly be used for selecting the current parameter set.

This algorithm can thus implement an artificial intelligence for detecting typical image scenarios, for example of chronologically consecutive single phases of a surgical intervention. The algorithm detects the present type of scene on the basis of previously performed training and on characteristic properties of a current section of the video data stream. Optionally, the algorithm can select a parameter set stored for this type of scene, which set is then used to adjust the display of the video signal on the monitor.

It is particularly advantageous in this approach of using an artificial intelligence for automatic adjustment of a display of the video signal on the monitor if the algorithm has been trained in advance, i.e., before applying the procedure, by means of human-supervised learning based on sample image data. This sample data can for example be video recordings of surgical interventions. The training can consist in having a surgeon classify these recordings, wherein the algorithm learns to detect these classes of recordings based on characteristic properties of the respective video recording and the feedback given by the surgeon.

This type of artificial intelligence (AI) enables the algorithm to automatically classify typical image scenarios and to specify the display settings of the monitor perceived as optimal by a human, for example, a medical professional, for the respective class identified by means of respective metadata and/or control data. In other words, the AI ensures that the optimum display settings are automatically set or specified at the monitor for each class of image scenarios trained, which may be typical of a class of surgical interventions, such that there can always be an optimum display of the video data stream. This adjustment of the display is preferably performed dynamically depending on the current image material in the video data stream.

The learned weighting of at least one evaluation parameter of the image evaluation can particularly be stored in an internal memory of the endoscopy system. Thus the algorithm can always access what it has learned from the training. Furthermore, this weighting can be retrieved from the memory during the procedure to generate the at least one parameter based on the weighting.

The at least one parameter can be transmitted to the monitor together with, or separately from, the video signal. Furthermore, the at least one parameter can be transmitted to the monitor together with the video signal via a common data transmission link, for example, a radio connection or a video cable, preferably utilizing an industrial standard for data transmission, such as HDR. Or the at least one parameter can be transmitted to the monitor separately via a separate data transmission link, for example a separate control cable.

Since different amounts of bandwidth must be used for transmitting the at least one parameter depending on the application and the video signal currently transmitted, transmission of the video signal can be adjusted based on the at least one parameter, which can for example provide information about a dynamic range needed. This adjustment of the transmission can particularly be made by adjusting a compression method used when transmitting the video data stream or a transmitted resolution of individual frames of the image sequence.

In specific applications, it can also be advantageous to use a monitor with the endoscopy system, which monitor has a high dynamic range (HDR) of at least 10 bits. In this case, it is particularly advantageous to dimension the at least one parameter for this dynamic range. Such a dimensioning can ensure that the dynamic range of the monitor is optimally utilized for displaying the video signal. For example, the procedure according to the invention can advantageously be applied to HDR-capable monitors, which have been commercially available since about 2015, for example based on the "HDR10" or "Dolby vision" industrial standards.

To solve the problem mentioned at the outset, the features of the first claim directed towards an endoscopy system are provided in an endoscopy system. Particularly, it is proposed for an endoscopy system of the type mentioned at the outset in order to solve the problem according to the invention that the image processing unit comprises parameter generator for generating at least one parameter by processing the video data stream and/or the sensor signal, wherein a display of the video signal on the monitor can be adjusted using the at least one parameter.

It will be appreciated that the monitor can be part of the video endoscopy system. Furthermore, the type of representing the parameter as well as the type of transmitting the parameter can be adapted for a specific type of monitor.

The at least one parameter can particularly comprise metadata which characterizes the video data stream to be displayed and/or control data for adjusting display parameters of the monitor. Furthermore, the image processing unit can be configured to transmit the at least one parameter to a monitor to be used with the endoscopy system or to a specific monitor as part of the endoscopy system.

Such an endoscopy system can be used to implement a procedure according to the invention as described at the outset, such that all respective advantages already described can be leveraged.

It will therefore be appreciated that the image processing unit of the endoscopy system according to the invention can be configured such that one of the procedures according to the invention described above according to a claim directed towards a procedure is implemented when the image processing unit processes the video data stream and/or the sensor signal.

The image processing unit can particularly be configured to analyze the sensor signal and/or the video data stream continuously to adjust the at least one parameter dynamically.

Furthermore, the image processing unit can be configured such that this adjustment is made depending on an instantaneous variable which is relevant for the display of the video data stream on the monitor.

To avoid thermal heating of the endoscope of the endoscopy system, it is advantageous that the image processing unit and thus the parameter generator are located in a camera control unit of the endoscopy system, wherein it is preferable if the camera control unit is spatially separated from the endoscope. In this way, the heat produced inevitably when generating the at least one parameter can be kept away from the endoscope.

Furthermore, the camera control unit can be configured to transmit the at least one parameter generated to the monitor, preferably together with the video signal via a common transmission link, for example, a video cable or a radio connection.

Lastly, the endoscopy system can also comprise a monitor for displaying the video signal. This monitor is advantageously configured to automatically adjust the display of the video signal and thus of the video data stream encoded therein, preferably globally for respective frames of the video data stream, based on the at least one parameter transmitted, that is, particularly based on metadata and/or control data transmitted. In this case, the parameter generator of the image processing unit can be set to a dynamic range and/or a resolution capacity of the monitor, for example with respect to a potential display of brightness and/or color and/or contrast values.

Lastly, a computer program product as described at the outset is proposed for solving the problem. This product is characterized in that a procedure according to the invention described above or a procedure according to any one of the claims directed towards a procedure can be implemented by means of the software code of the computer program product if the software code is executed by a controller of the endoscopy system, particularly by an image processing unit of the endoscopy system. Existing endoscopy systems can thus be configured for performing a procedure according to the invention using the computer program product.

The invention will now be described in more detail based on exemplary embodiments, but it is not limited to these exemplary embodiments. Other exemplary embodiments result from combining the features of individual or multiple patent claims with each other and/or with individual or multiple features of the respective exemplary embodiment. Particularly, embodiments of the invention can be derived from the following description of a preferred exemplary embodiment in conjunction with the general description, the claims, and the drawings.

BRIEF DESCRIPTION OF THE DRAWINGS

Wherein.

DETAILED DESCRIPTION

Figure 1:
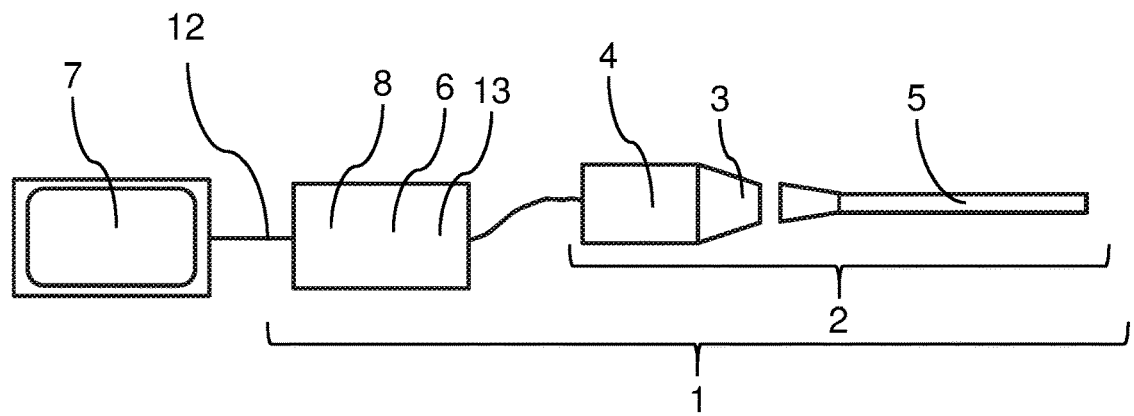
FIG. 1 shows a greatly simplified, merely exemplary schematic view of an endoscopy system according to the invention.

FIG. 1 shows an endoscopy system 1 according to the invention, consisting of an endoscope 2, which comprises an endoscope shaft 5 carrying a recording optic and a camera head 4 with an image sensor 3, and a camera control unit 6 connected to the endoscope 2 for controlling the image sensor 3 and for outputting a video signal 10.

An image sequence consisting of multiple frames is recorded using the image sensor 3 of the endoscopy system 1, wherein the image sensor 3 outputs a sensor signal 9 which encodes the image sequence.

A video data stream is generated from the sensor signal 9 by means of an image processing unit 8, which is placed in the camera control unit 6. The video data stream is encoded by the image processing unit 8 into the video signal 10, which is transmitted via a video cable used as data transmission link 12 to a monitor 7 to be displayed by the monitor 7. The endoscopy system 1 thus is a video endoscopy system with which live images can be generated.

It will be appreciated that such endoscopy systems according to the invention can be implemented in numerous embodiments. For example, an endoscopy system according to the invention can comprise a chip-in-tip endoscope in which the image sensor 3 is placed in a distal region of the endoscope shaft, particularly in the endoscope tip. Furthermore, an endoscopy system according to the invention can also be implemented b y a video endoscope in which one or more image sensors 3 can be located in a proximal handle (a so-called chip-in-scope endoscope). Likewise, the image processing unit 8 can be arranged at different points of the endoscopy system, depending on the application.

Figure 2:
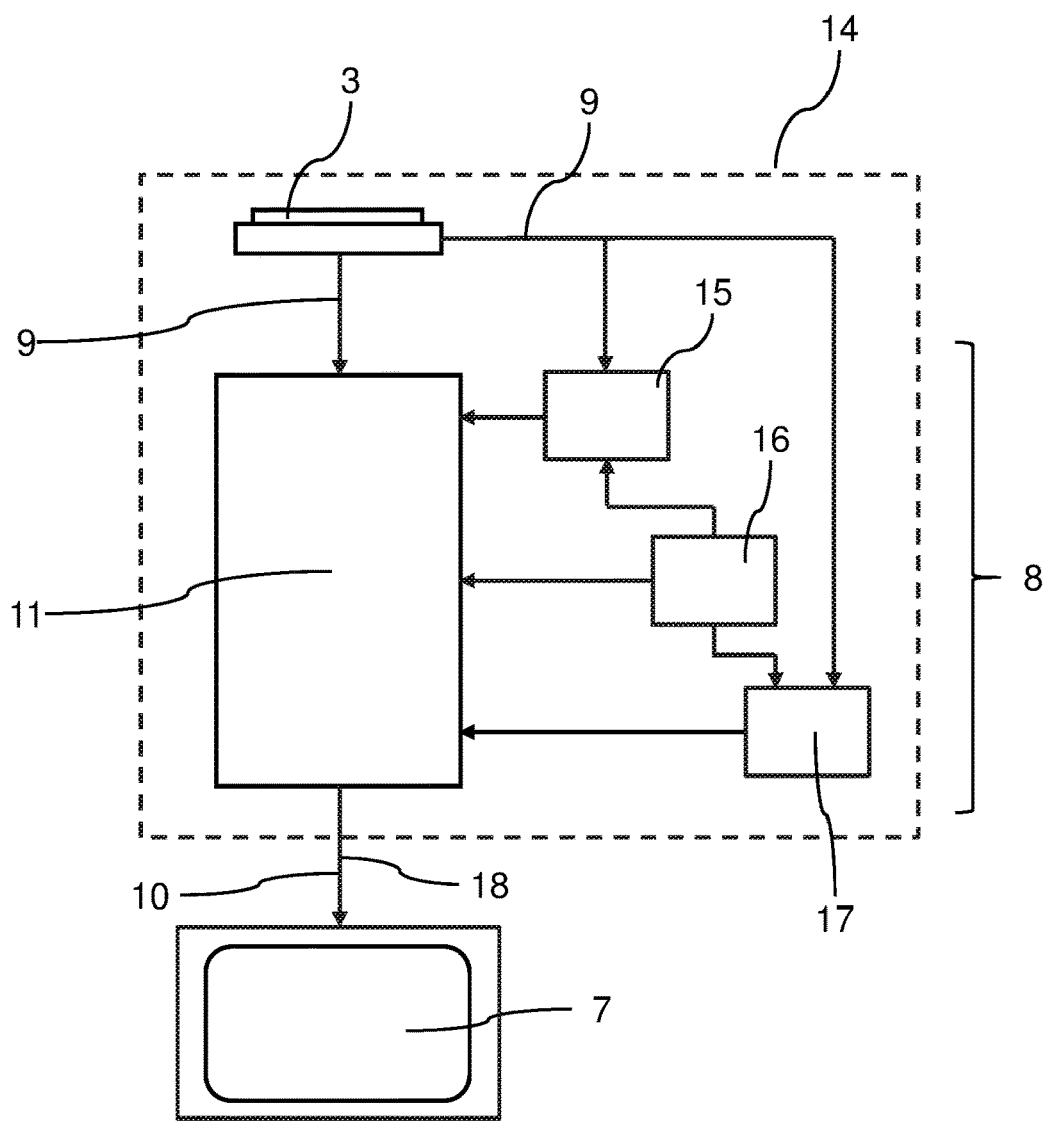
FIG. 2 shows a schematic diagram of signal paths within the endoscopy system of FIG. 1.

As FIG. 2 illustrates, the image processing unit 8 consists of multiple components and together with the image sensor 3 forms a video signal generator 14 for generating the video signal 10.

First, the image processing unit 8 comprises a signal processing unit 17 for generating the video data stream by processing the sensor signal 9. This signal conversion is preferably performed in real time, such that the camera control unit 6 generates a live video data stream which can be displayed in real time on the monitor 7.

The sensor signal 9 is further processed by an algorithm 15, which implements an artificial intelligence (AI). It is not shown in FIG. 2 that the AI algorithm 15 can also access the video data stream provided by the signal processing unit 17 to analyze that stream. The artificial intelligence identifies specific classes of recording situations or image scenarios in the sensor signal 9 or in the video data stream obtained from the sensor signal 9 and passes this information on to a parameter generator 11.

In addition, the image processing unit 8 comprises an input unit 16 by means of which a user can enter an advance setting of the image processing unit 8 to a specific recording situation, for example, to a specific class of surgical interventions, which can correspond to a specific medical discipline and is to be recorded using the video endoscopy system 1. This information flows from the input unit 16 to the AI algorithm 15 and to the parameter generator 11.

The image processing unit 8 lastly comprises said parameter generator 11, which receives input signals from the AI algorithm 15, from the input unit 16, and from the signal processing unit 17, as can be seen in FIG. 2.

The parameter generator 11 initially generates metadata based on the video data stream, which metadata characterizes the video data stream, for example, a current brightness or dynamic image color range. Based on this metadata and taking into account the input signals the parameter generator 11 receives from the AI algorithm 15 and from the input unit 16, the parameter generator 11 calculates a set of control data. To this end, the parameter generator 11 accesses an internal memory 13 in the camera control unit 6 (see FIG. 1), where sets of parameters optimized for different image recording conditions are stored in advance for the control data. This considerably reduces the calculation effort, such that the parameter generator 11 can have a comparatively simple structure and thus produces low power loss.

The parameter generator 11 processes all this information and generates a set of current control data 18, which is transmitted together with the video signal 10 via the video cable acting as data transmission link 12 to the monitor 7, as shown in FIG. 2.

To this end, the control data is added to the video signal. This is done continuously during the operation of the video endoscopy system 1. In other words, the parameter generator 11 generates the transmitted control data 18 continuously and in real time.

In doing so, the parameter generator 11 takes the metadata generated from the video data stream into account, that is, particularly metadata of a chronological excerpt of the video data stream, if desired also the class of recording situation determined by the AI and, if applicable, an advance setting of the image processing unit 8 made by a user via the input unit 16.

Figure 3:
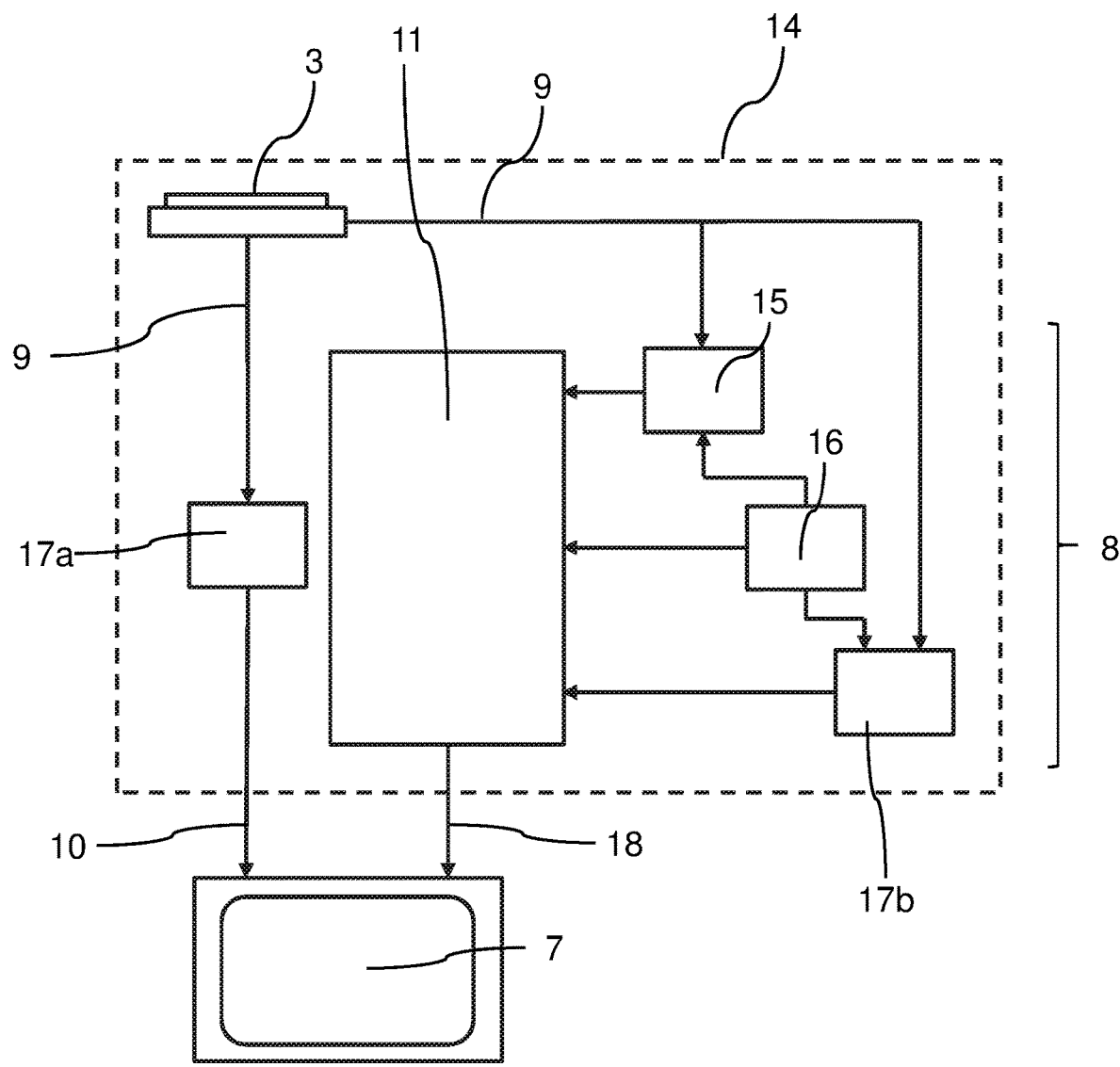
FIG. 3 shows a schematic diagram of signal paths within another endoscopy system according to the invention.

FIG. 3 now shows another potential embodiment of an endoscopy system 1 according to the invention. Unlike the schematic view of FIG. 2, the video signal 10 and the control data 18 are transmitted separately to the monitor 7 in the endoscopy system 1 according to FIG. 3, which is illustrated by two signal arrows in FIG. 3. However, the control data 18 is generated analogously by the parameter generator 11, as described above for the example of FIG. 2. A first signal processing unit 17a is used to generate the video signal 10, while a second signal processing unit 17b is used to provide data for the parameter generator 11.

It should be pointed out here that a procedure according to the invention may also comprise transmitting, instead of control data 18, only metadata 18 or at least one other parameter to the monitor 7.

In such a case, control data can be generated at the location of the monitor 7 using the metadata or the at least one parameter transmitted.

Particularly, the parameter generator 11 according to the invention can be located at the location of the monitor 7, which itself can be part of the endoscopy system 1, rather than in the camera control unit 6. In this case, the image processing unit 8 according to the invention is locally distributed at the sites of the camera control unit 6 and the monitor 7. Another option is that the parameter generator 11 remains in the camera control unit 6 and merely sends metadata 18 to the monitor 7, which itself automatically generates control data 18 from the metadata 18 transmitted to adjust the display of the video signal 10. In these cases as well, the advantageous technical effects of the invention, namely adaptive improvement of the display of the video signal 10 on the monitor 7, can similarly be implemented while taking the current video data stream into account.

To summarize, it is proposed for improving the display of a variable video data stream recorded with a video endoscopy system 1 on a monitor 7 that the video endoscopy system 1 automatically transmits at least one parameter and transmits it to the monitor 7, wherein the display of a currently transmitted section of the video data stream, preferably in real time, can be adjusted using the parameter to enable an adjusted display of that section on the monitor 7.

What is claimed is:

1. A method of performing an endoscopy procedure, the method comprising:
   recording a live-image sequence of a surgical situation as a respective scene using an image sensor of an endoscope of a medical endoscopy system, the image sensor outputting a sensor signal encoding the live-image sequence;
   generating a live-video data stream from the live-image sequence via an image processing unit of the endoscopy system;
   producing a live-video signal from the live-video data stream: and
   transmitting the live-video data stream to a monitor by means of the live-video signal, which is to be displayed by the monitor;
   wherein, when producing the live-video signal, at least one parameter comprising control data for adjusting display parameters of the monitor is generated by the image processing unit,
   wherein the control data comprised in the at least one parameter are used to adjust a display of the live-video signal on the monitor;
   such that the image processing unit has a controlling influence on the monitor and the display of the live-video data stream, visualizing the scene recorded with the endoscope, on the monitor is automatically adjusted by the medical endoscopy system using the control data and without any user input to provide adaptive improvement of the display of the scene on the monitor,
   wherein the at least one parameter is stored in an internal memory of the endoscopy system in the form of a collection of parameter sets, which each set being optimized for a different image recording condition during a specific class of surgical intervention, and wherein the image processing unit comprises a selection device, which selects a respective parameter set from the stored parameter sets for transmission to the monitor, and wherein this selection is based on at least one of
(i) the sensor signal representing said scene or
(ii) (ii) an image evaluation of the live-video data stream representing said scene.

2. The method of claim 1, wherein the at least one parameter is adjusted dynamically by said image processing unit of the endoscopy system, if a variable relevant to the display of the video data stream on the monitor changes significantly, such that changing recording conditions automatically result in a respectively adjusted display of the video signal on the monitor, wherein the variable includes a dynamic range of an image brightness to be displayed on the monitor, a color to be displayed on the monitor, or a contrast space to be displayed on the monitor.

3. The method of claim 1, wherein the at least one parameter comprises metadata for the display parameters of the monitor including at least one selected from the group of: a background lighting, a dynamic range to be resolved of an image brightness, a color space, and an image contrast; and
wherein control data and/or display parameters are generated from the metadata by the monitor, with which the display of the video signal on the monitor can be adjusted.

4. The method of claim 1, wherein the at least one parameter is generated before transmitting the video signal to the monitor, but only after producing the video signal; and
wherein the at least one parameter is transmitted to the monitor synchronously with an associated chronological section of the video signal and allowing the display of the chronological section on the monitor to be adjusted live without a time delay.

5. The method of claim 1, wherein the display of the video signal and the video data stream encoded therein are adjusted based on the at least one parameter transmitted globally for respective frames of the video data stream by the monitor; and
wherein at least one of dynamic range and a resolution capacity of the monitor with respect to a potential display of brightness, color, and/or contrast values is taken into account when generating the at least one parameter.

6. The method of claim 1, wherein the image sequence includes real-time images transmitting a live video to the monitor; and
wherein the at least one parameter is generated in real time, transmitted synchronously together with the live video signal to the monitor, continuously generated together with the live video signal while the image sequence is recorded using the image sensor of the endoscopy system, and/or the added in real time to the video signal during image recording to dynamically adjust the display of the video signal in real time.

7. The method of claim 1, wherein the at least one parameter is dynamically generated from the video data stream in such a manner that the at least one parameter changes automatically as soon as at least one evaluation parameter, which is obtained from the video data stream, changes significantly, and
wherein the at least one evaluation parameter is obtained from brightness, color, and/or contrast values of the image sequence, and the at least one evaluation parameter is compared to a threshold value.

8. The method of claim 1,
wherein the selection of the respective parameter set is based on a determined dynamic range, a determined distribution of an image brightness, an image contrast, and/or on image colors of the sensor signal or the video data stream, respectively.

9. The method of claim 1, wherein, alternatively or in addition, the selection of the current parameter set is made by a user of the endoscope based on a selection of preset parameter sets offered by the endoscopy system, each of the preset parameter sets being optimized for typical recording conditions of a respective class of surgical interventions such that in a static transmission mode between two selections made by the user static metadata; static control data is transmitted to the monitor.

10. The method of claim 1, wherein an image evaluation of the video data stream performed for generating the at least one parameter is based on an algorithm which is trained using sample image data implementing an artificial intelligence for identifying typical image scenarios including individual phases of a surgical intervention, wherein the algorithm is trained by means of human-supervised learning based on sample image data and/or a learned weighting of at least one evaluation parameter of the image evaluation is stored in an internal memory of the endoscopy system, and wherein the weighting is retrieved from the memory including during the procedure to generate the at least one parameter based on the weighting.

11. The method of claim 1, wherein the at least one parameter is transmitted to the monitor together with the video signal via a common data transmission link including a radio connection or a video cable using an industrial standard for data transmission, or wherein the at least one parameter is transmitted separately from the video signal via a separate data transmission link including a separate control cable to the monitor.

12. The method of claim 1, wherein the transmission of the video signal is adjusted depending on the at least one parameter; the at least one parameter provides information about a required dynamic range by adjusting a compression method used for transmitting the video data stream or a resolution of frames of the image sequence transmitted.

13. The method of claim 1, wherein a monitor used in the procedure has a dynamic range of at least 10 bits and wherein the at least one parameter is adapted for these dynamic ranges.

14. A non-transitory computer readable medium comprising instructions, which, when carried out by a control device of an endoscopy system instruct the endoscopy system to perform a method according to claim 1.

15. The endoscopy system of claim 1 wherein the at least one parameter transmitted to the monitor is dynamically adjusted if a color space or a contrast space to be displayed on the monitor changes.

16. The endoscopy system of claim 1, wherein the control data set a background lighting, a color space; an image contrast to be resolved by the monitor; and wherein the control data are transmitted to the monitor together with or separate from the video signal to be displayed on the monitor.

17. The endoscopy system of claim 1, wherein the generation of the at least one parameter is based on at least one of:
(i) an analysis of the sensor signal representing said scene, or
(ii) an analysis of the live-video data stream representing said scene or an analysis of the live-video signal representing said scene, or (iii) an analysis of the live-video signal representing said scene.

18. An endoscopy system, comprising:
an endoscope having an image sensor for outputting a sensor signal, which encodes a live-image sequence of a surgical situation as a respective scene, and
an image processing unit for generating a live-video data stream by processing the sensor signal and for outputting a live-video signal which encodes the live-video data stream and which can be displayed on a monitor;
wherein the image processing unit comprises a parameter generator for generating at least one parameter comprising control data for adjusting display parameters of the monitor by processing the sensor signal of the endoscopic image sensor of the endoscope and/or by processing the live-video data stream;
wherein a display of the video signal on the monitor is adjusted automatically by the endoscopy system using the control data such that the image processing unit has a controlling influence on the monitor and the display of the live-video data stream, visualizing a scene recorded with the endoscope, on the monitor is automatically adjusted by the medical endoscopy system using the control data and without any user input to provide adaptive improvement of the display of the scene on the monitor,
wherein the at least one parameter is stored in an internal memory of the endoscopy system in the form of a collection of parameter sets, which each set being optimized for a different image recording condition during a specific class of surgical intervention and
the image processing unit comprises a selection device which is configured to select a respective parameter set from the stored parameter sets for transmission to the monitor based on at least one of
(i) the sensor signal representing said scene or
(ii) an image evaluation of the live-video data stream representing said scene.

19. The endoscopy system of claim 18 wherein the image processing unit is configured to continuously analyze the sensor signal and/or the video data stream to dynamically adjust the at least one parameter using the parameter generator depending on an instantaneous variable of the video data stream or the video signal which is relevant to the display of the video data stream on the monitor.

20. The endoscopy system of claim 18, wherein the image processing unit and the parameter generator are located in a camera control unit of the endoscopy system, wherein the camera control unit is spatially separated from the endoscope to keep heat produced when generating the at least one parameter, including the metadata and/or control data, away from the endoscope; and/or
wherein the camera control unit is configured to transmit the at least one parameter generated together with the video signal to the monitor via a common data transmission link including a video cable or a radio connection.

21. The endoscopy system of claim 18, wherein the endoscopy system further comprises:
a monitor for displaying the video signal, the monitor is configured to automatically adjust the display of the video signal and the video data stream encoded therein based on the at least one parameter transmitted, that the at least one parameter is based on transmitted metadata and/or control data and globally for respective frames of the video data stream, and the parameter generator is set to a dynamic range and/or a resolution capacity of the monitor with respect to a potential display of brightness, color, and/or contrast values.

22. The endoscopy system according to claim 18, wherein the endoscopy system comprises an endoscope and a camera control unit;
wherein the camera control unit is connected to the endoscope for controlling the endoscopic image sensor built into the endoscope and for outputting the live-video signal to the monitor;
wherein the image processing unit comprises a signal processing unit for generating the live-video data stream by processing the sensor signal of the endoscopic image sensor; and
wherein the image processing unit, comprising said signal processing unit and said parameter generator, is placed in the camera control unit, such that the control data are generated within the camera control unit and transmitted from the camera control unit to the monitor.

* * * * *